United States Patent [19]
Yoshimura

[11] Patent Number: 5,958,079
[45] Date of Patent: Sep. 28, 1999

[54] MEMORY CARD WITH ERROR CORRECTION SCHEME REQUIRING REDUCING MEMORY CAPACITY

[75] Inventor: Yoshimasa Yoshimura, Tokyo, Japan

[73] Assignee: Mitsubishi Denki Kabushiki Kaisha, Tokyo, Japan

[21] Appl. No.: 08/867,887

[22] Filed: Jun. 3, 1997

[30] Foreign Application Priority Data

Jan. 8, 1997 [JP] Japan ................................ P09-001306

[51] Int. Cl.⁶ ............................ G11C 29/00; G06F 13/42
[52] U.S. Cl. ........................... 714/766; 714/767; 714/773; 711/103
[58] Field of Search ......................... 365/185.17, 185.09; 395/307; 371/40.12, 40.4, 40.11, 40.18; 714/766, 767, 773; 711/103

[56] References Cited

U.S. PATENT DOCUMENTS 5,699,549  12/1997  Cho ......................................... 395/442
5,754,567   5/1998  Norman ................................. 371/40.18

FOREIGN PATENT DOCUMENTS

A-54-5416    1/1979  Japan.
A-58-45614   3/1983  Japan.
A-59-134937  8/1984  Japan.
A-4 291434  10/1992  Japan.
A-5 182372   7/1993  Japan.

Primary Examiner—William Grant
Assistant Examiner—Iván Calcaño

[57] ABSTRACT

A memory card includes an error-correction-code (ECC) controller for generating ECCs, an ECC memory for storing ECCs generated by the ECC controller and an address converter for converting between addresses of the ECC memory and those of a main memory for storing data. The ECC controller generates an ECC to be stored in the ECC memory when a control data is input and the address converter fetches a relationship between an address of the ECC memory at which the generated ECC is stored and that of the main memory at which the control data is stored. Upon reading data stored in the main memory, error check and error correction operations are executed for the control data.

11 Claims, 8 Drawing Sheets

MEMORY CARD WITH ERROR CORRECTION SCHEME REQUIRING REDUCING MEMORY CAPACITY

BACKGROUND OF THE INVENTION

1. Field of the invention

The present invention is related generally to a memory card, more particularly to a memory card which improves the reliability of data such as image data formed in a standardized data format and yet maintains the compatibility of the data.

2. Description of the prior art

The image data used in the Internet and a digital camera has a standardized format and is handled by an information processing device such as a personal computer. The image data comprises a large amount of pixel data and a small amount of control data for specifying, for example, color information, display size, and a compression scheme. A small error of a few bits made in the large pixel data portion affects only a few pixels among a vast number of pixels in a whole image and will cause only a negligible problem. However, even a one-bit error in the control data portion affects the entire image and, in some cases, may cause the image to disappear completely.

From the foregoing one can expect that data correction for only the control data portion will effectively improve data reliability when image data is stored in a memory card. A problem, however, is that adding an error correction code to the image data causes its data format to deviate from the standardized format and makes the image data incompatible. Therefore, the error correction code must be stored in a memory space separate from the image data memory space. However, since the size of the image data varies, the spatial relation between the memory space for storing the error correction codes and the main memory space for storing the image data cannot be fixed.

SUMMARY OF THE INVENTION

The present invention, therefore, provides a memory card for storing image data which improves the reliability of the image data by using an error correction code yet still maintains the data compatibility.

Another object of the present invention is to provide a memory card capable of executing error check and error correction with a minimum volume of memory.

A further object of the present invention is to provide a memory card capable of executing error check and error correction only for important data such as control data.

In order to achieve these objects, according to the present invention, there is provided a memory card having an interface for connecting the memory card to a host system comprising an information processing device to receive data from the host system and store the data therein, the memory card comprising: a first memory for storing the data from the host system; an error-correction-code (ECC) controller for generating error correction codes, detecting data errors, and correcting the errors; a second memory for storing the error correction codes generated by the ECC controller; an address converter for relating an address of the first memory to an address of the second memory portion; and a controller for controlling the first memory, the ECC controller, the second memory, and the address converter; wherein the ECC controller generates an error correction code when a specific data is sent from the host system and the address converter stores information about an address of the second memory, where the generated ECC is stored, in relation to an address of the first memory where the specific data is stored.

The term "specific data" means data specifically indicated by the host system and/or control or management data contained in together with image data to be stored in the first memory.

Upon reading out data stored in the first memory, an address designated by the host system is checked if it is stored in the address converter. If so, error check and error correction operations are executed for the data identified by the address while using an ECC stored at an address corresponding to the address of the specific data.

In one embodiment of the present invention, the controller searches the data stored in the first memory, has the ECC controller generate an error correction code, and stores the generated error correction code in the second memory while the controller is in the standby mode in which the host system is not trying to access the controller.

In another embodiment of the present invention, the address converter is a data table which relates an address of the first memory portion to an address of the second memory portion and which the controller updates every time the controller stores an error correction code in the second memory portion by adding, to the table data, the address of the second memory portion where the error correction code is stored and the address of the first memory portion where the specific data associated with the error correction code is stored relating the two addresses to each other.

The ECC controller may generate an error correction code for each byte of the specific data or an error correction code for each block of the specific data.

The error correction code may be a Hamming code or a copy of specific data and its checksum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying diagrams wherein.

DESCRIPTION OF PREFERRED EMBODIMENTS

The present invention will be described with reference to embodiments shown in the accompanying drawings.

Figure 1:
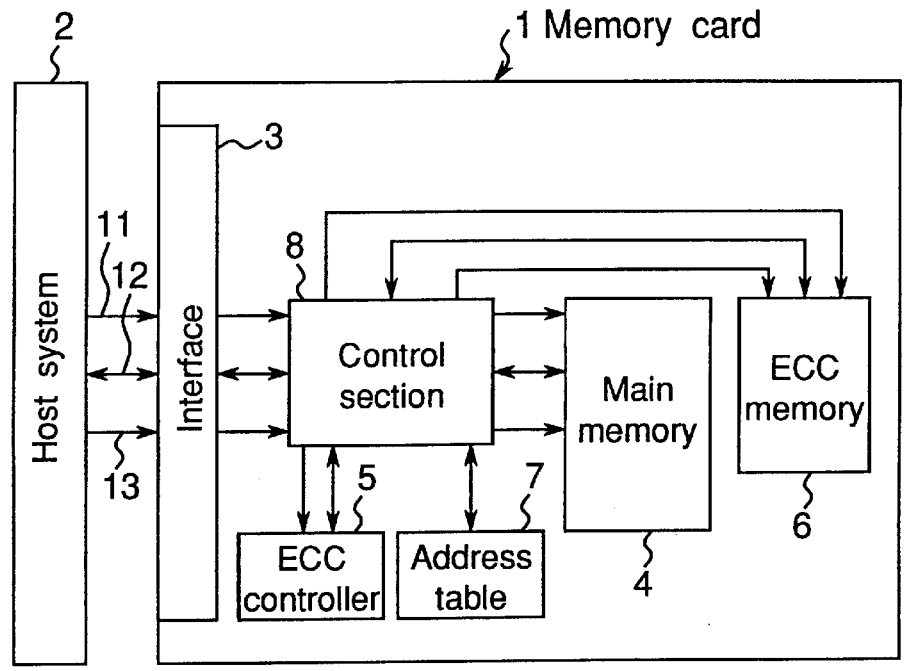
FIG. 1 is a block diagram of the memory card of the first embodiment of the present invention.

FIG. 1 is a schematic block diagram of a memory card of Embodiment 1 of the present invention.

Referring to FIG. 1 a memory card 1 comprises an interface 3 for connecting the memory card to a host system 2 including information processing devices such as personal computers (PC); a main memory portion 4 for storing image data received from the host system 2; an ECC controller 5 for generating an error correction code for specified data, and detecting and correcting a data error using the generated error correction code; an ECC memory portion 6 for storing the error correction code generated by the ECC controller 5; an address table 7 used for assigning an address of the ECC memory portion 6 where the error correction code generated by the ECC controller 5 is stored; and a controller 8 for controlling the main memory portion 4, the ECC controller 5, the ECC memory portion 6, and the address table 7.

The address table 7 includes information on the address of the main memory 4 where the image control data is stored and the address of the ECC memory portion 6 where the error correction code is stored, the error correction code being generated for the image control data by the ECC controller 5 following the command of the controller 8. The address table also includes the information which relates the two addresses to each other. When the memory card 1 is a personal computer (PC) card in conformity with the PC card standard, the interface 3 comprises a connector and an electronic circuit interfacing with the host system 2.

The interface 3 is connected to the host system 2 via an address bus 11, a data bus 12, and control signal lines 13, and is also connected to the controller 8 via an internal address bus, an internal data bus, and internal control signal lines. The controller 8 is connected, in turn, to the main memory portion 4 and the ECC memory portion 6, respectively, via an internal address bus, an internal data bus, and internal control signal lines. Further, the controller 8 is connected to the ECC controller 5 via an internal data bus and control signal lines, and to the address table 7 via an internal address bus. The main memory portion 4 is referred to as the first memory portion; the ECC memory portion 6, as the second memory portion; and the address table 7, as the address converter.

Address data, image data, and control signals from the host system 2 are provided through the interface 3 to the controller 8 via the address bus 11, the data bus 12, and the control signal lines 13, respectively. Thus the host system 2 provides the controller 8 with signals such as an output enable signal, a write enable signal, and a chip enable signal through the control signal lines 13 in order to control the main memory portion 4, the ECC controller 5, and the ECC memory portion 6.

The operation of writing image data from the host system 2 to the memory card 1 will be described next.

The host system 2 sends out, through the control signal lines 13, a request signal requesting an error correction code for the error-intolerant, critical word portion of the control data of the image data to be stored in the memory card 1. Receiving the control signal through the interface 3, the controller 8 has the ECC controller 5 generate an error correction code for the critical word and writes the generated error correction code in the ECC memory portion 6.

Referring to the address table 7, the controller 8 assigns an address of the ECC memory portion 6 where the error correction code generated by the ECC controller 5 is stored. The address table 7 relates the assigned address to the address of the main memory 4 where the critical word portion is to be stored. The controller 8 then stores the error correction code at the assigned address and updates the address table 7. Once the controller 8 receives a code termination signal from the host system 2 through the interface 3 for terminating generation of an error correction code, it stops having the ECC controller 5 generate an error correction code and stops assigning an address of the ECC memory portion 6 where an error correction code is stored until it receives from the host system 2 the next request signal for error correction code generation.

Figure 2:
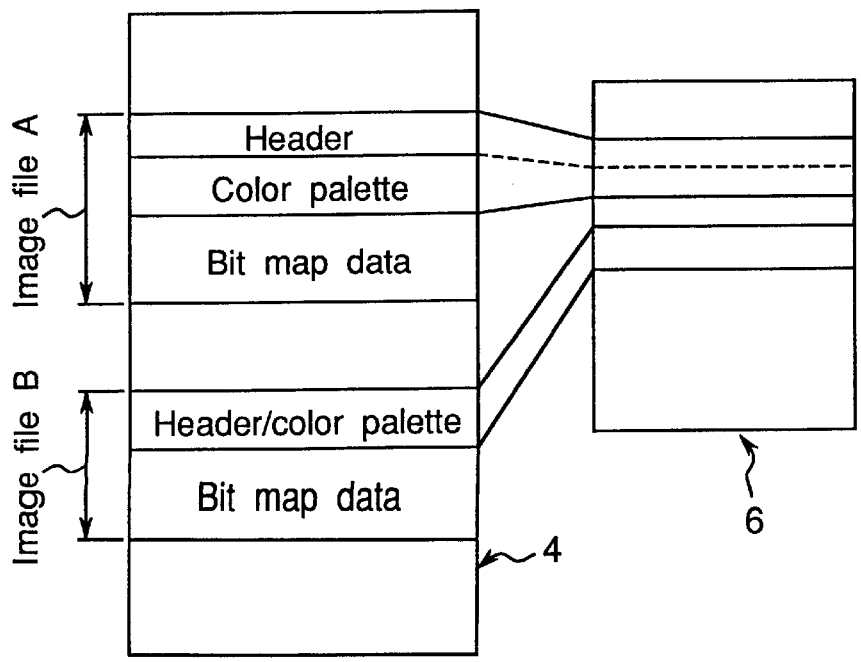
FIG. 2 shows memory maps of the main memory portion and the ECC memory portion shown in FIG. 1.

FIG. 2 shows a memory map between the main memory 4 and the ECC memory portion 6 for a bit map file. An image file sent from the host system 2 comprises a critical word portion which does not tolerate any data error and bit map data which carry color numbers for each pixel and which may allow data error of a few bits because the error does not significantly affect the image quality. The critical word portion comprises a header including information related to the display size, the number of colors, and the data compression scheme, and a color pallet which assigns color data to the specified color number.

Next, the error correction code that the controller 8 has the ECC controller generate will be described below. Generally the ECC controller 5 generates error correction codes using a well known method, and the controller 8 detects error bits using the error correction codes generated by the ECC controller 5. In the following a method will be described below in which the Hamming code is employed as an error code for detecting a bit error for each byte.

For example, assume that a four-bit error correction code $e3-e0$ is generated by computing Equations (1)–(4) corresponding to a 8-bit byte data of $d7-d0$.

$$e0 = d0 + d1 + d3 + d4 + d6 \tag{1}$$

$$e1 = d0 + d2 + d3 + d5 + d6 \tag{2}$$

$$e2 = d1 + d2 + d3 + d7 \tag{3}$$

$$e3 = d4 + d5 + d6 + d7 \tag{4}$$

In computing (1)–(4) the exclusive logical sum is applied; that is, $1+1=0+0=0$ and $1+0=0+1=1$.

Now let byte data to be expressed as $d[7:0]$ and its corresponding error correction code as $e[3:0]$. Further, let data with a one-bit error originating from the data $d[7:0]$ be $dx[7:0]$ and its corresponding error correction code as $ex[3:0]$. Now compare $e[3:0]$ with $ex[3:0]$, that is, compute their exclusive logical sum and express the number thus obtained in the decimal system. If the obtained number is 3, the bit d0 has an error; if the obtained number is 5, the bit d1 has an error; if the obtained number is 6, the bit d2 has an error; if the obtained number is 7, the bit d3 has an error; if the obtained number is 9, the bit d4 has an error; if the obtained number is 10, the bit d5 has an error; if the obtained number is 11, the bit d6 has an error; if the obtained number is 12, the bit d7 has an error.

For example, if $d[7:0]=11010101$, $e[3:0]=1011$. If d3 of $d[7:0]$ has an error, $dx[7:0]$ is 11011101, and the corresponding error correction code $ex[3:0]=1100$. Comparing $e[3:0]$ with $ex[3:0]$ or computing the exclusive logical sum of $e[3:0]$ and $ex[3:0]$ results in "0111". This number in the decimal number system is 7, which is consistent with the aforementioned statement. Thus the Hamming code, which is defined for every byte, allows one to detect and correct a one-bit error.

Figure 3:
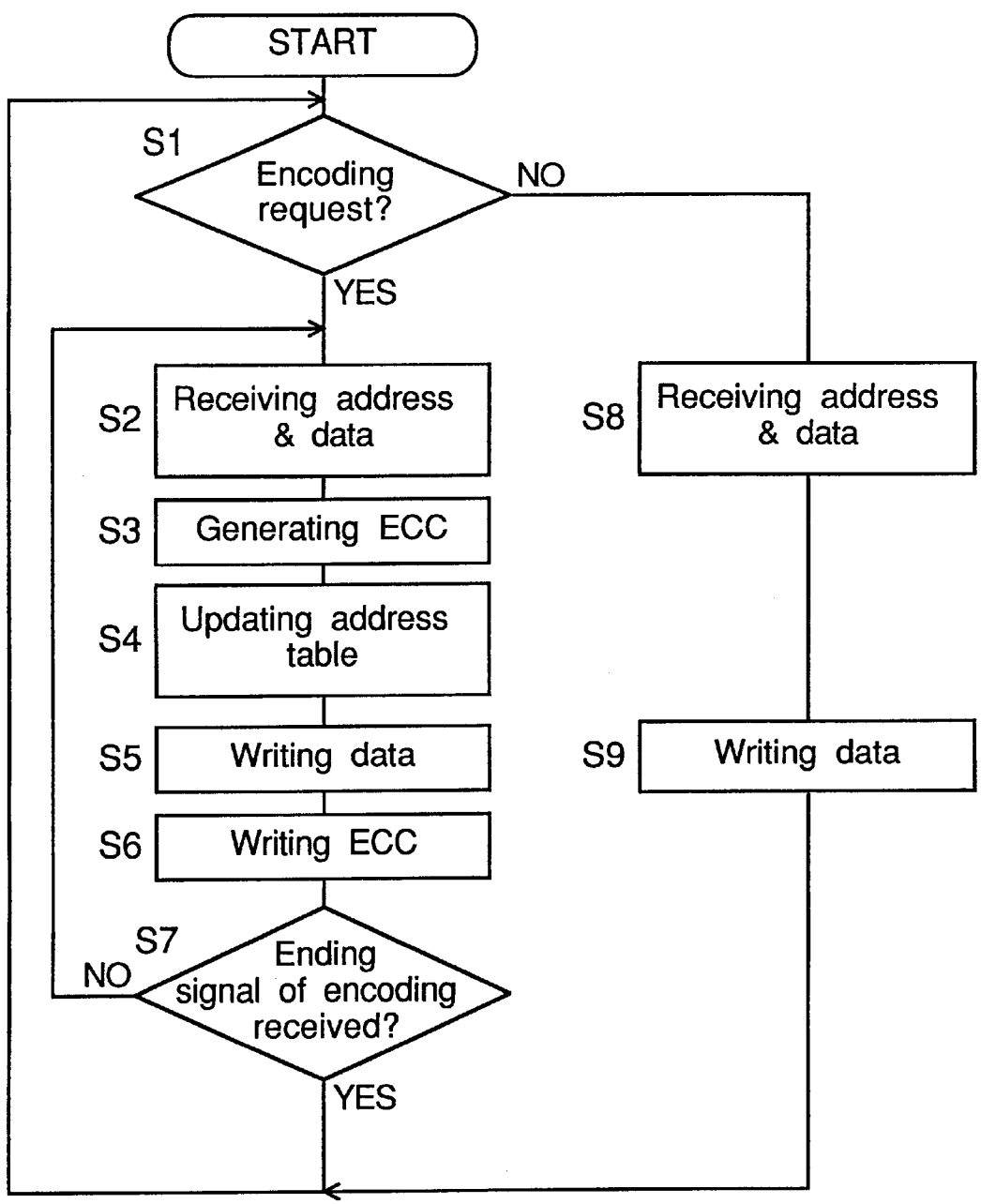
FIG. 3 is a flow chart for the writing operation in which the controller 8 shown in FIG. 1 writes image data.

FIG. 3 is a flow chart of the memory card 1 shown in FIG. 1 writing image data from the host system 2. Every process shown in FIG. 3 is performed by the controller 8 unless explicitly stated otherwise.

Referring to FIG. 3, in the step S1 the controller 8 checks to determine whether the host system 2 is requesting an error correction code to be generated by producing a request signal for an error correction code. If the controller 8 receives a request signal for an error correction code (YES), it advances to the step S2, where the controller 8 receives address data and image data from the host system 2 via the address bus and the data bus respectively.

Next, in the step S3, the controller 8 has the ECC controller 5 generate an error correction code for the image data from the host system 2. In the step S4 the controller 8 assigns an unused address of the ECC memory portion 6 to address data from the host system 2 by using the address table 7 and then updates the address table 7. Next, in the step S5, the controller 8 writes the image data at the specified address of the main memory portion 4 and advances to the step S6, where the controller 8 writes the error correction code generated by the ECC controller 5 at the address of the ECC memory portion 6 which was previously assigned in the address table.

In the step S7 the controller 8 checks to determine whether the host system 2 is requesting termination of the generation of an error correction code by producing a request signal for terminating the generation of an error correction code. If the controller 8 receives the request signal for terminating the generation of an error correction code (YES), it returns to the step S1. If the controller 8 receives no request signal for terminating the generation of an error correction code (NO), it goes back to the step S2.

If the controller 8 does not receive, in the step S1, the request signal for an error correction code (NO), it advances to the step S8, where it receives address data and image data from the host system 2 via the address bus and the data bus respectively. Next, in the step S9, the controller 8 does not ask the ECC controller 5 to generate an error correction code, but writes the data sent from the host system 2 via the data bus at the address of the main memory 4 specified by the host system 2, and thus returns to the step S1. Thus the cycle of the process of writing the image data to the main memory 4 and the error correction codes to the ECC memory portion 6 concludes.

Next, the operation of reading the image data stored in the memory card 1 will be described.

When the host system 2 is to read the image data stored in the main memory portion 4, it outputs to the controller 8 a read command signal via the control signal lines and the address data which indicates the address of the image data to be read in the main memory portion 4 through the interface 3. After receiving the read command signal, the controller 8 refers to the address table 7. If an address of the ECC memory portion 6 has been assigned to the address sent from the host system 2, the controller 8 reads the error correction code stored at the assigned address in the ECC memory portion 6.

Further, the controller 8 provides the retrieved error correction code to the ECC controller 5, which performs data correction, using the provided error correction code, on the data stored at the address of the main memory portion 4 specified by the address data from the host system 2. Then the controller 8 sends out the data corrected by the ECC controller 5 to the host system 2 through the interface 3 and the data bus. If no address of the ECC memory portion 6 has been assigned to the address sent from the host system 2, the controller 8 sends out, without correction, the data stored at the address of the main memory portion 4 specified by the address data from the host system 2.

Figure 4:
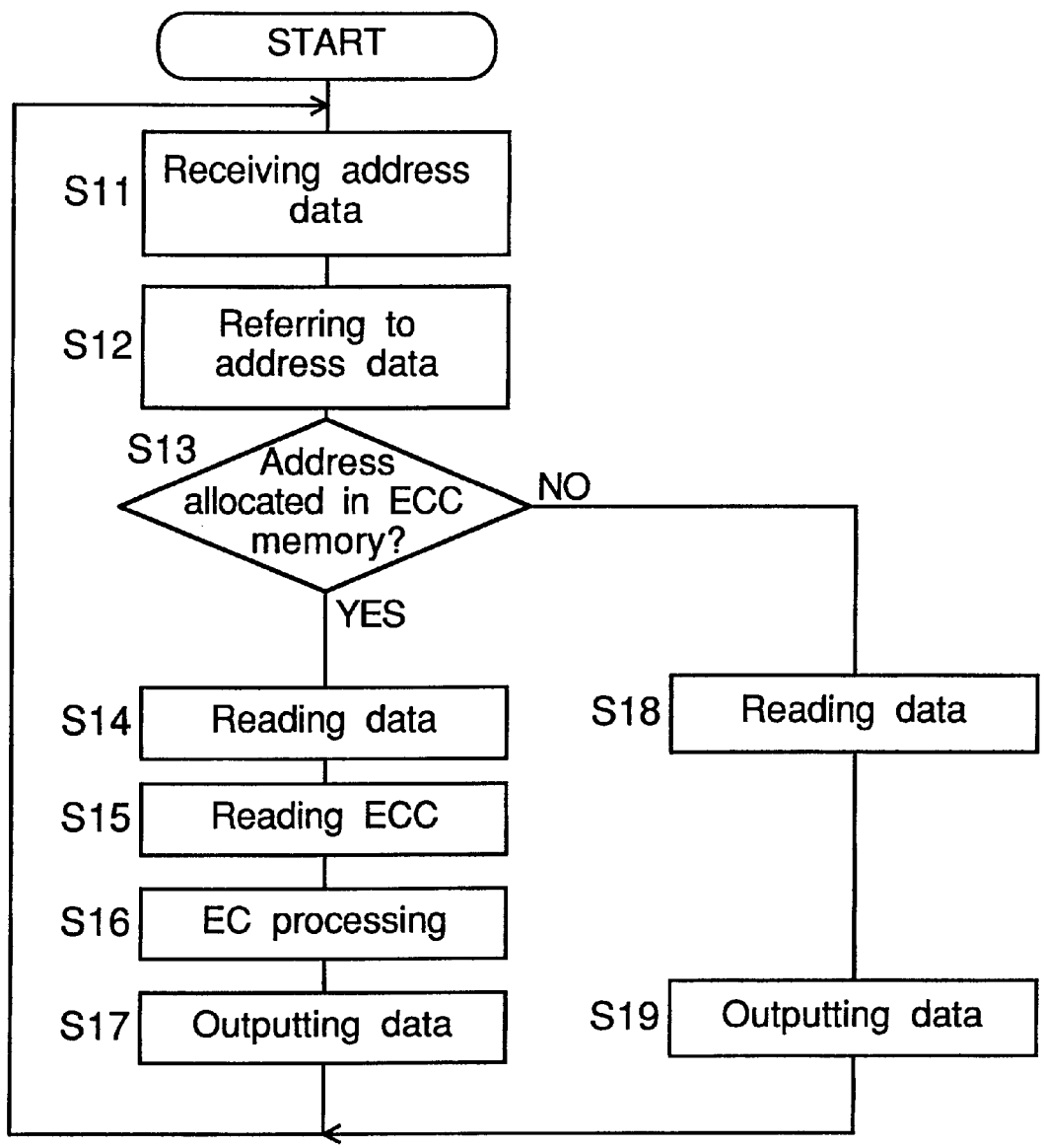
FIG. 4 is a flow chart for the reading operation in which the controller 8 shown in FIG. 1 reads image data.

FIG. 4 is a flow chart of the memory card 1 shown in FIG. 1 reading image data stored in the main memory portion 4. Every process shown in FIG. 4 is performed by the controller 8 unless explicitly stated otherwise.

Referring to FIG. 4, the controller 8 in the step S11 receives, through the interface 3, the read command signal and address data from the host system 2. Next, in the step S12, the controller 8 refers to the address table 7. In the step S13 the controller 8 checks to determine whether an address of the ECC memory portion 6 has been assigned to the address sent from the host system 2. If an address has been assigned (YES), the controller 8 advances to the step S14.

In the Step S14 the controller 8 reads the data stored at the address of the main memory portion 4 specified by the address data from the host system 2. In the Step 15 the controller 8 reads the error correction code stored at the address of the ECC memory portion 6 assigned by the address table 7. In the step 16 the controller 8 has the ECC controller 5 check to determine whether there is an error on the data retrieved from the main memory portion 4 using the error correction code retrieved from the ECC memory portion 6. If the ECC controller 5 detects an error, it corrects the error. If the ECC controller 5 does not detect an error, it does not perform the error correction operation.

In the Step S17, the controller 8 sends out the data error-corrected by the ECC controller 5 to the host system 2 through the interface 3 via the data bus and then returns to S11. In the step S13, if the controller 8 finds that no address of the ECC memory portion 6 has been assigned in the address table 7 (NO), it advances to the step S18 where it reads the data stored at the address of the main memory portion 4 specified by the address data from the host system 2. Next, in the step S19, the controller 8 sends out the data retrieved from the main memory portion 4 to the host system 2 through the interface 3 via the data bus and then returns to S11. Thus the read operation of the image data from the main memory portion 4 has been completed.

The memory card of Embodiment 1 of the present invention generates an error correction code for each byte of the error-intolerant control data within the image data without changing its data format. The address table maintains the address of the ECC memory portion 6 where the error correction code is stored and the address of the main memory portion 4 where the control data is stored thereby relating the two addresses to each other.

Obviously adding error correction codes to image data improves its reliability. In the present invention error correction codes are generated only for the critical portion of the image data, which reduces the memory capacity necessary to store the redundant error correction code data. Moreover, the Hamming coding employed in the present embodiment further reduces the memory capacity required to store the redundant error correction code data. The generation of an error correction code for each byte of the critical word portion of the image data facilitates the internal processes of the controller 8, reduces the process time, and improves the response of the memory card.

Further, since the image data stored in the main memory portion 4 has the conventional standardized data format, adding error correction codes directly to the image data is not desirable. Yet the memory card of the present invention can be used with a conventional host system which does not support the error correction method of the present invention. The host system 2 neither generates error correction codes itself nor corrects data using the error correction codes thus keeping the host system operation program simple.

Embodiment 2

In Embodiment 1 an error correction code is generated for each byte of data. Since image data is normally read as a block unit, however, it may be desirable to generate an error code for each data block. This scheme constitutes Embodiment 2 of the present invention.

Figure 5:
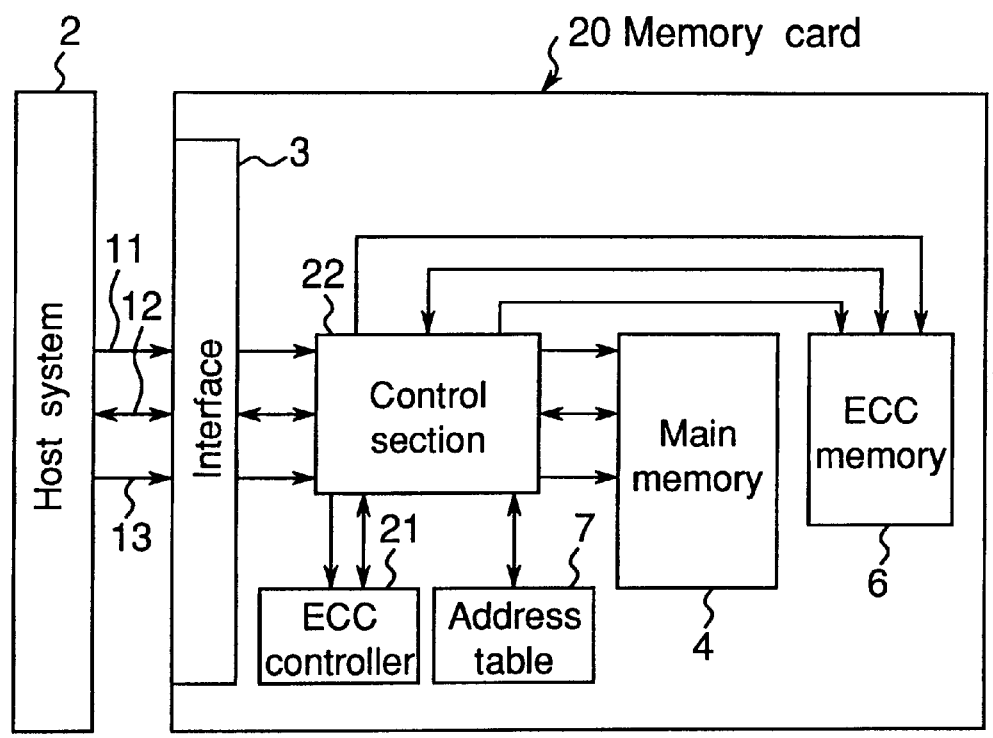
FIG. 5 is a block diagram of the memory card of the second embodiment of the present invention.

FIG. 5 is a schematic block diagram of a memory card of Embodiment 2 of the present invention. The like reference numerals of FIGS. 5 and 1 indicate identical or functionally similar elements. Thus an explanation of those elements will not be repeated and only the differences from FIG. 1 will be described below.

The difference of FIG. 5 from FIG. 1 is that an ECC controller 21 and a controller 22 of FIG. 5 replace the ECC controller 5 and the controller 6 of FIG. 1 respectively. The memory card of the present embodiment is referred to as the memory card 20 in reflecting this difference.

Referring to FIG. 5 the memory card 20 comprises an interface 3; a main memory portion 4; an ECC controller 21 for generating an error correction code for each block of specified data and detecting and correcting a data error using the generated error correction code; an ECC memory portion 6 for storing the error correction code generated by the ECC controller 21; an address table 7 used for assigning an address of the ECC memory portion 6 to the error correction code generated by the ECC controller 21; and a controller 22 for controlling the main memory portion 4, the ECC controller 21, the ECC memory portion 6, and the address table 7.

The interface 3 is connected to the controller 22 via an internal data bus, an internal address bus, and internal control signal lines. The controller 22, in turn, is connected to the main memory portion 4 and the ECC memory portion 6 via the internal data bus, the internal address bus, and the internal control signal lines. Further, the controller 22 is connected to the ECC controller 21 via the internal data bus and the internal control signal lines and is connected to the address table 7 via the internal address bus.

Address data, image data, and control signals from the host system 2 are provided through the interface 3 to the controller 22 via the address bus 11, the data bus 12, and the control signal lines 13, respectively. Thus the host system 2 provides the controller 22 with signals such as an output enable signal, a write enable signal, and a chip enable signal through the control signal lines 13 in order to control the main memory portion 4, the ECC controller 21, and the ECC memory portion 6.

The operation of writing image data from the host system 2 to the memory card 20 will be described next.

The host system 2 sends out, through the control signal lines 13, a request signal requesting an error correction code for the error-intolerant, critical word portion of the control data of the image data to be stored in the memory card 20. Receiving the control signal through the interface 3, the controller 22 has the ECC controller 21 generate an error correction code for each block of the critical word portion and writes the generated error correction code in the ECC memory portion 6.

The controller 22, referring to the address table 7, assigns an address of the ECC memory portion 6 where the error correction code generated by the ECC controller 21 is stored. The address table 7 relates the assigned address to the address of the main memory 4 where the block data of the critical word portion is to be stored. The controller 22 then stores the error correction code at the assigned address and updates the address table 7.

The controller 22 keeps generating error correction codes until it receives, from the host system 2 through the interface 3, a code termination signal for terminating the generation of the error correction codes, that is, until the controller 22 completes generating error correction codes for all the data blocks of the critical word portion of the image data. Once the controller 22 receives the code termination signal, it stops having the ECC controller 21 generate an error correction code and stops assigning an address of the ECC memory portion 6 where an error correction code is stored until it receives from the host system 2 the next request signal for error correction code generation.

The error correction code that controller 22 has the ECC controller 21 generate will be described now. The ECC controller 21 generates error correction codes by means of a well known method and detects error bits using the error correction codes generated by the ECC controller 5. Assume that the Hamming code is employed as an error correction code to detect error bits in the block data and that an error correction code of the bit length k is generated for block data including N bytes. Then, the bit length k must satisfy the inequality (5) below:

$$2^k - 1 \geq N*8 + k. \quad (5)$$

The inequality (5) is valid for a block which has a one-bit error.

Figure 6:
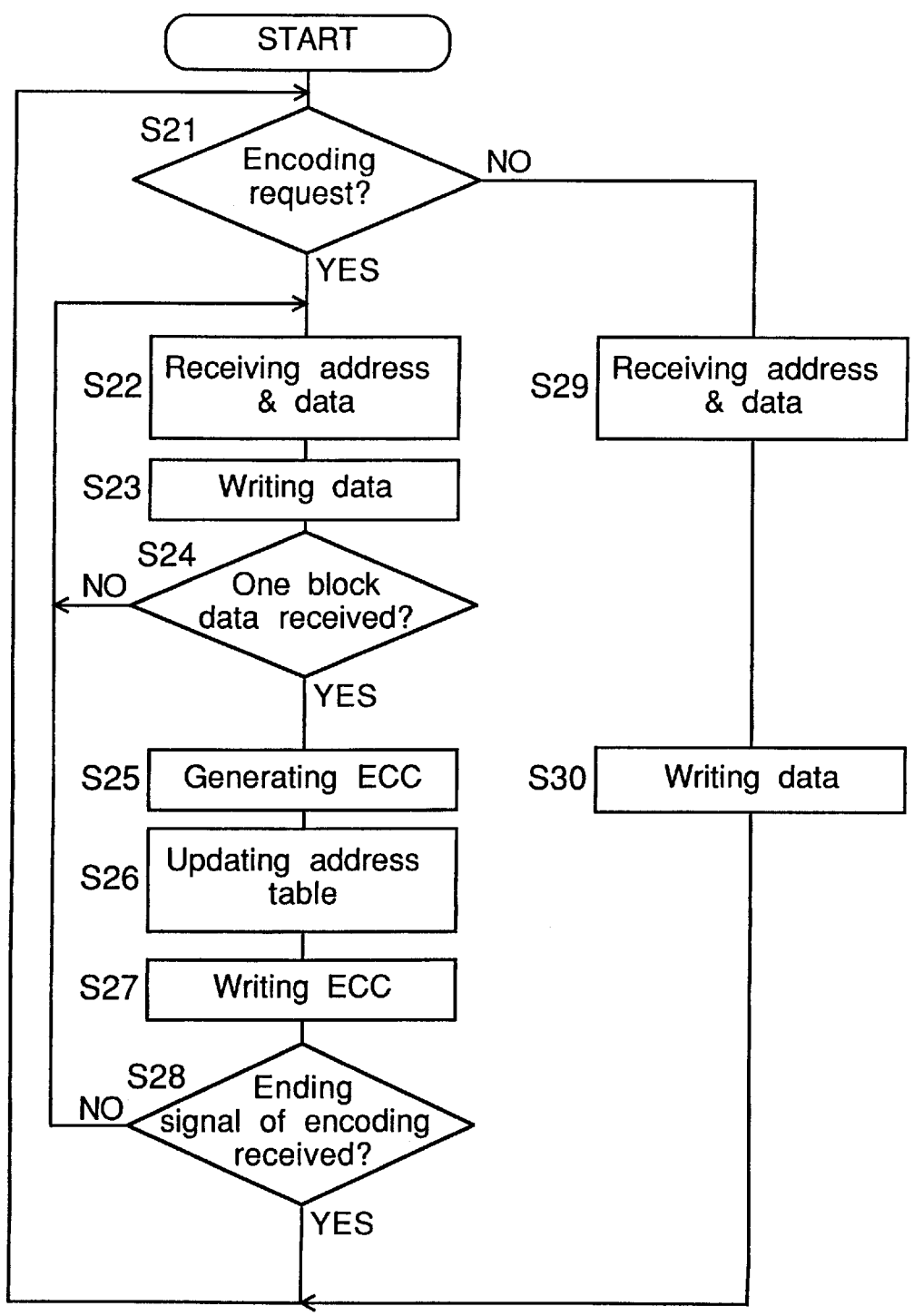
FIG. 6 is a flow chart for the writing operation in which the controller 22 shown in FIG. 5 writes image data.

FIG. 6 is a flow chart of the memory card 20 shown in FIG. 5 writing image data from the host system 2. Every process shown in FIG. 6 is performed by the controller 22 unless explicitly stated otherwise.

Referring to FIG. 6, the controller 22 in the step S21 checks to determine whether the host system 2 is requesting an error correction code to be generated by producing a request signal for an error correction code. If the controller receives a request signal for an error correction code (YES), it advances to the step S22, where the controller receives address data and image data from the host system 2 via the address bus and the data bus respectively.

Next, in the step S23, the data sent from the host system 2 is stored at the specified address of the main memory portion 4. In the step S24 the controller checks to determine whether the entire block data has been sent from the host system 2. If the controller finds that the entire block data has already been sent (YES), it advances to the step S25. If the controller finds that the entire block data has not been sent (NO), it returns to the step S22.

Next, in the step S25, the controller has the ECC controller 21 generate an error correction code for the block data of the image data from the host system 2. In the step S26 the controller assigns an unused address of the ECC memory portion 6 to an address data for the block data from the host system 2 by using the address table 7 and then updates the address table 7. In the step S27 the controller writes the error correction code generated by the ECC controller 21 at the address of the ECC memory portion 6 which was previously assigned in the address table 7.

In the step S28 the controller 22 checks to determine whether the host system 2 is requesting termination of the generation of an error correction code by producing a request signal for terminating the generation of an error correction code. If the controller 22 receives the request signal for terminating the generation of an error correction code (YES), it returns to the step S21. If the controller 22 receives no request signal for terminating the generation of an error correction code (NO), it goes back to the step S22.

If the controller 22 does not receive, in the step S21, the request signal for an error correction code (NO), it advances to the step S29, where it receives address data and image data from the host system 2 via the address bus and the data bus respectively. Next, in the step S30, the controller 22 does not ask the ECC controller 21 to generate an error correction code, but writes the data sent from the host system 2 via the data bus at the address of the main memory 4 specified by the host system 2, and then returns to the step S21. Thus the cycle of the process of writing the image data to the main memory 4 and the error correction codes to the ECC memory portion 6 concludes.

Next, the operation of reading the image data stored in the memory card 20 will be described.

When the host system 2 is to read the image data stored in the main memory portion 4, it outputs to the controller 22 both a read command signal via the control signal lines and the address data which indicates the address of the image data to be read in the main memory portion 4 through the interface 3.

Receiving the read command signal, the controller 22 refers to the address table 7. If an address of the ECC memory portion 6 has been assigned to the address of the main memory portion 4 sent from the host system 2 and if the data stored at that address of the main memory portion 4 is the starting data of block data, the controller 22 halts data transfer to the host system 2, reads the block data, and transfers it to a buffer (not shown) provided in the memory card. Next, controller 22 reads the error correction codes stored at the address of the ECC memory portion 6 assigned by the address table 7 which corresponds to the block data stored in the buffer.

Further, the controller 22 provides the ECC controller 21 with the block data stored in the buffer and the error correction codes just retrieved from the ECC memory portion 6. The ECC controller 21 performs an error correction on the block data using the error correction codes, both having just been provided by the controller 22. Then the controller 22 transfers the corrected block data back to the same address of the main memory portion 4 where the block data had been stored before the block data was retrieved and resumes the data transfer in order to transfer the data stored at the address of the main memory portion 4 which the host system specifies.

If the data stored at that address of the main memory portion 4 specified by the host system 2 is not the starting data of the block data, or if an address of the ECC memory portion 6 has not been assigned to the address of the main memory portion 4 sent from the host system 2, the controller 22 transfers the data at the address of the main memory portion 4 specified in the address data sent from the host system 2.

Figure 7:
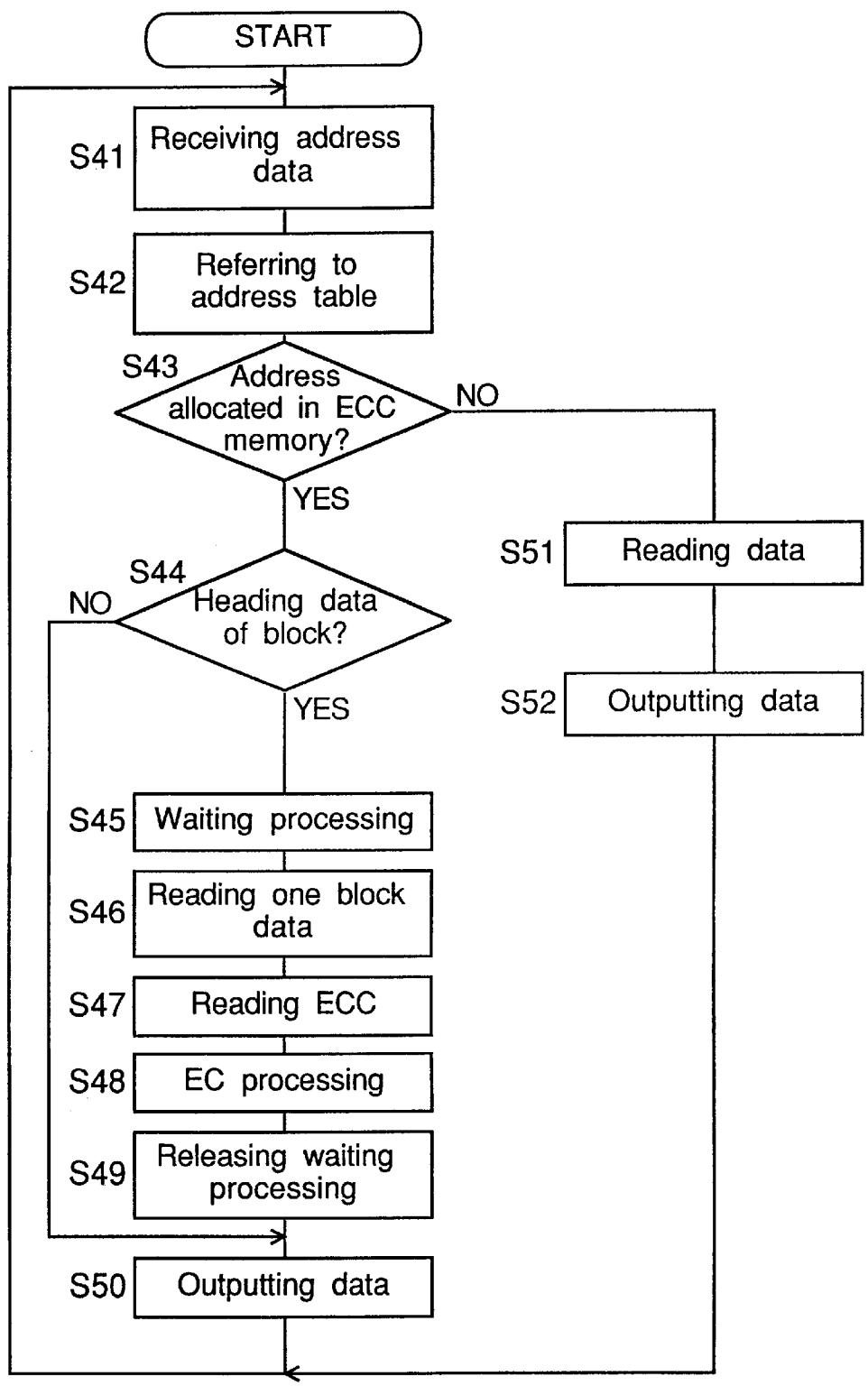
FIG. 7 is a flow chart for the reading operation in which the controller 22 shown in FIG. 5 reads image data.

FIG. 7 is a flow chart of the memory card 20 shown in FIG. 5 reading image data stored in the main memory portion 4. Every process shown in FIG. 7 is performed by the controller 22 unless explicitly stated otherwise.

Referring to FIG. 7, the controller 22 in the step S41 receives, through the interface 3, the read command signal and address data from the host system 2. Next, in the step S42, the controller 22 refers to the address table 7. In the step S43 the controller 22 checks to determine whether an address of the ECC memory portion 6 has been assigned to the address sent from the host system 2. If an address has been assigned (YES), the controller 22 advances to the step S44.

In the step S44, the controller 22 checks to determine whether the byte data stored at the address specified by the host system is the starting data of the block data. If the byte data is the starting data of the block data (YES), the controller 22 advances to the step S45, where it performs the waiting process to halt the data transfer to the host system 2. Then, in the step S46, the controller 22 reads the block data in the main memory portion 4 which starts with the byte data specified by the address data from the host system 2, transfers the block data to a buffer provided in the memory card, and advances to the step S47.

In the step S47, the controller 22 reads the error correction codes stored at the address of the ECC memory portion 6 which is assigned by the address table 7 to the block data stored in the buffer. Next, in the step S48, the ECC controller 21 checks, using the error correction codes retrieved from the ECC memory portion 6, to determine whether the block data stored in the buffer has any data error. If the ECC controller 21 finds a data error, it corrects the error, and the controller 22 transfers the error-corrected block data back to the same address of the main memory portion 4 where the block data had been stored before it was retrieved. If the ECC controller 21 finds no data error, it does not perform the error correction operation on the block data, and the controller 22 transfers the block data stored in the buffer back to the same address of the main memory portion 4 where the block data had been stored before it was retrieved.

Next, in the step S49, the controller 22 resets the waiting process. In the step S50, the controller 22 transfers the byte data stored at the address of the main memory portion 4 specified in the address data from the host system 2 to the host system 2 through the interface 3 via the data bus and then returns to the step S41. If the controller 22 finds, in the step S44, that the byte data stored at the address specified in the address data from the host system 2 is not the starting data of a block data (NO), it advances to the step S50.

In the step S43, if the controller 22 finds that no address of the ECC memory portion 6 has been assigned in the address table 7 (NO), it advances to the step S51, where it reads the data stored at the address of the main memory portion 4 specified by the address data from the host system 2. Next, in the step S52, the controller 22 sends out the data read from the main memory portion 4 to the host system 2 through the interface 3 via the data bus and then returns to S41. Thus the read operation of the image data from the main memory portion 4 has been completed.

The memory card of Embodiment 2 of the present invention generates an error correction code for each block of the error-intolerant control data within the image data without changing its data format. The address table maintains the address of the ECC memory portion 6 where the error correction code is stored and the address of the main memory portion 4 where the control data is stored relating the two addresses to each other.

Obviously adding error correction codes to the image data improves its reliability. In the present invention error correction codes are generated only for the critical portion of the image data, which reduces the necessary memory capacity to store the redundant error correction code data. The Hamming coding employed in the present embodiment to generate error correction codes for block data further reduces the memory capacity to store the redundant error correction code data.

Further, since the image data stored in the main memory portion 4 has the conventional standardized data format, adding error correction codes directly to the image data is not desirable. Yet the memory card of the present invention can be used with a conventional host system which does not support the error correction method of the present invention. The host system 2 neither generates error correction codes itself nor corrects data using the error correction codes, which keeps the operation program of the host system simple.

Embodiment 3

Embodiments 1 and 2 require the error correction code request signal and the code termination signal from the host system 2 in order for the critical word portion of image data to be written to and to be read from the main memory portion 4. Embodiment 3, however, which will be described below, needs neither a request signal nor a code termination signal for writing and reading image data in the main memory portion 4. It stores image data using the conventional method, recognizes the critical word portion of the stored image data, and generates error correction codes for the critical word portion. Embodiment 3 will be described comparing it to Embodiment 2.

Figure 8:
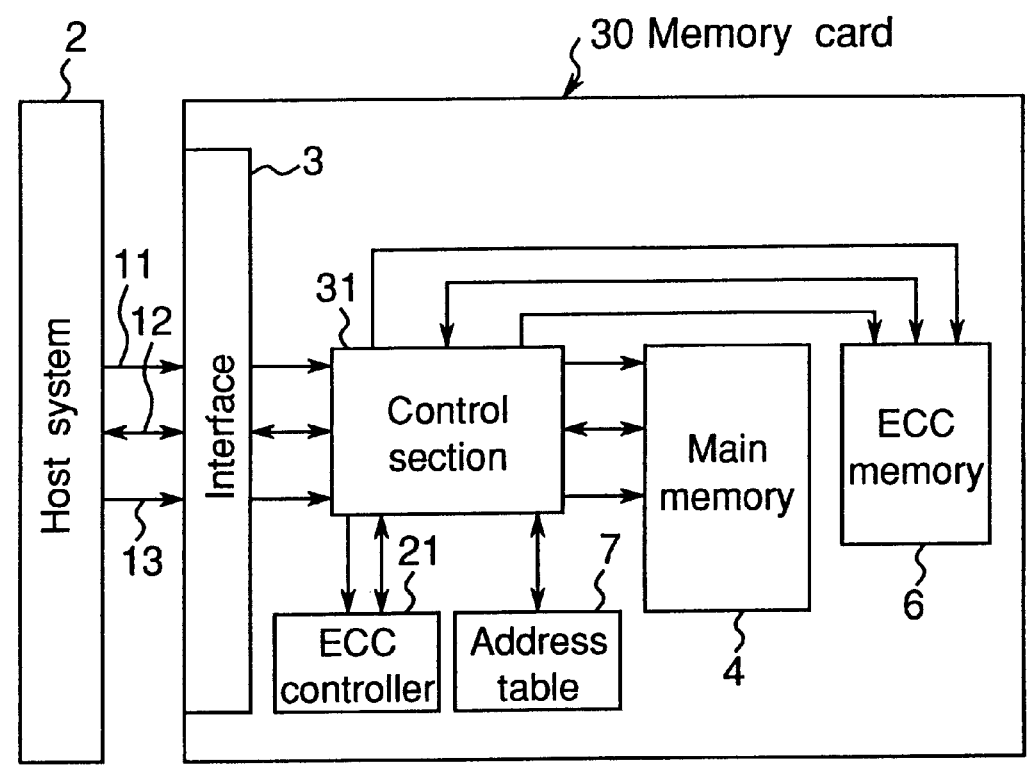
FIG. 8 is a block diagram of the memory card of the third embodiment of the present invention.

FIG. 8 is a schematic block diagram of a memory card of Embodiment 3 of the present invention. The like reference numerals in FIGS. 8, 5, and 1 indicate identical or functionally similar elements. Thus an explanation of those elements will not be repeated and only the differences from FIG. 5 will be described below.

The difference between FIG. 8 and FIG. 5 is that a controller 31 of FIG. 8 replaces the controller 22 of FIG. 5. The memory card of the present embodiment is, therefore, referred to as the memory card 30 to reflect this difference.

Referring to FIG. 8, the memory card 30 comprises an interface 3; a main memory portion 4; an ECC controller 21; an ECC memory portion 6 for storing the error correction code generated by the ECC controller 21; an address table 7 used for assigning an address of the ECC memory portion 6 to the error correction code generated by the ECC controller 21; and a controller 31 for controlling the main memory portion 4, the ECC controller 21, the ECC memory portion 6, and the address table 7.

The interface 3 is connected to the controller 31 via an internal data bus, an internal address bus, and internal control signal lines. The controller 31 in turn is connected to the main memory portion 4 and the ECC memory portion 6 via the internal data bus, the internal address bus, and the internal control signal lines. Further, the controller 31 is connected to the ECC controller 21 via the internal data bus and the internal control signal lines and is connected to the address table 7 via the internal address bus.

Address data, image data, and control signals from the host system 2 are provided through the interface 3 to the controller 31 via the address bus 11, the data bus 12, and the control signal lines 13, respectively. Thus the host system 2 provides the controller 31 with signals such as an output enable signal, a write enable signal, and a chip enable signal through the control signal lines 13 in order to control the main memory portion 4, the ECC controller 21, and the ECC memory portion 6.

The operation of writing image data from the host system 2 to the memory card 30 will be described next.

Responding to the write request signal and the address data sent from the host system 2, the controller 31 writes the data sent from the host system 2 through the data bus in the main memory portion 4 using the conventional method. The image data includes an identification code at a specific position in the data which identifies the format of the data. Once the format being used is known, the data structure and hence the critical word portion are recognized.

This allows the controller 31 to check the contents of the image data written in the main memory portion 4 and to identify its critical word portion while the controller 31 is in the standby mode, that is when the host system 2 is not requesting the controller to write or read data. The controller 31 retrieves the critical word portion in the block unit, temporarily stores it in a buffer (not shown) provided in the memory card, and has the ECC controller 21 generate an error correction code for the block data stored in the buffer. Then the controller 31 stores the error correction code generated by the ECC controller 21 in the ECC memory portion 6.

The controller 31, referring to the address table 7, assigns an address of the ECC memory portion 6 where the error correction code generated by the ECC controller 21 is stored. The address table 7 relates the assigned address to the address of the main memory 4 where the block data of the critical word portion is stored. The controller 31 then stores the error correction code at the assigned address and updates the address table 7. Thus the controller 31 can generate an error correction code for each block data of the critical word portion of the image data and store it in the ECC memory portion 6.

Figure 9:
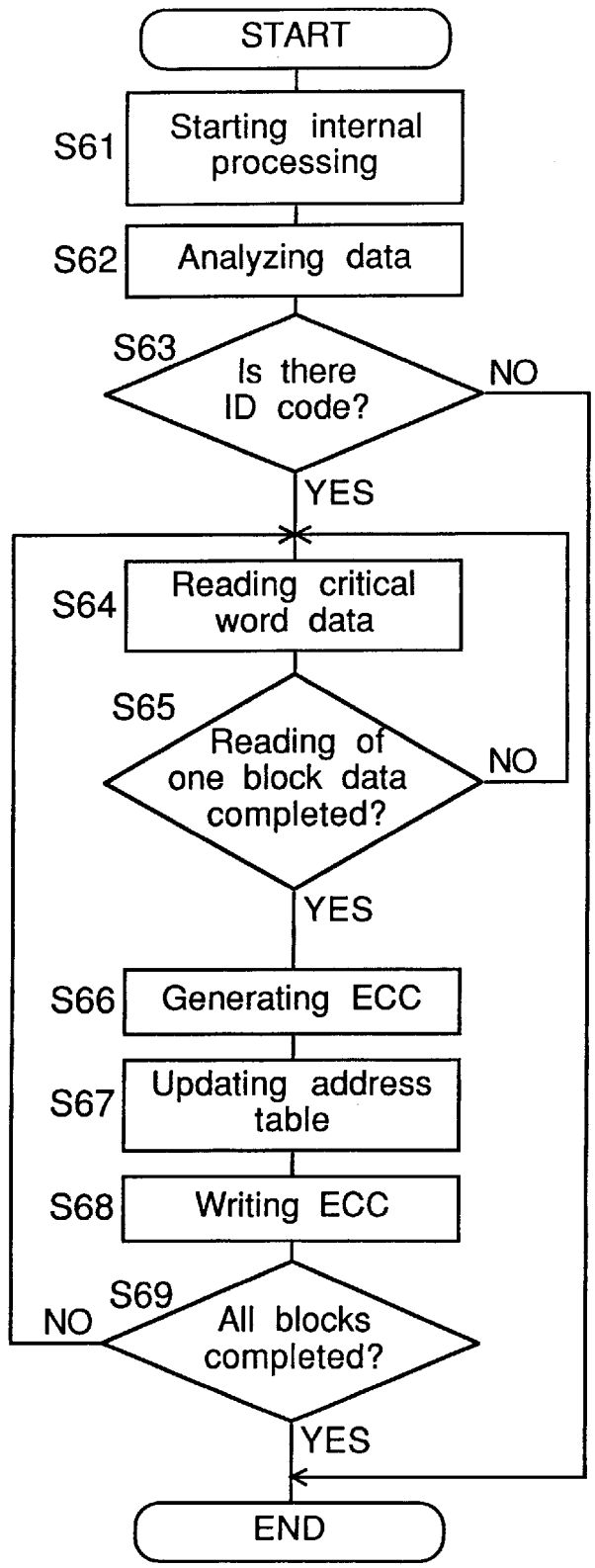
FIG. 9 is a flow chart for the operation of the controller 31 shown in FIG. 8 in which the controller generates and stores error correction codes.

Next, generation and storage of the error correction code will be described in detail. FIG. 9 is a flow chart of the memory card 30 shown in FIG. 8 generating and storing an error correction code. Every process shown in FIG. 9 is performed by the controller 31 unless explicitly stated otherwise.

Referring to FIG. 9, in the step S61, while the host system 2 is not accessing the memory card, the controller starts an internal process of retrieving image data stored in the main memory portion 4, the critical word portion of which do not have error correction codes associated with them.

Next, in the step S62, the controller 31 analyzes the data of the header of the image data. In the step S63 the controller 31 checks to determine whether the header includes an ID code. If it includes an ID code (YES), it advances to the step S64. If it does not have an ID code (NO), this operation ends. In the step S64 the controller 31 reads only the critical word portion and stores it in a buffer provided in the memory card. In the step S65 it checks to determine whether it has read all data of the block unit from the critical word portion. If it has already read a block unit (YES), it advances to the step S66. If it has not yet read the entire block unit (NO), it returns to the step S64.

In the step S66, the ECC controller 21 generates an error correction code for the block data from the critical word portion stored in the buffer. In the step S67 the controller assigns an unused address of the ECC memory portion 6 to the address data of the block data of the critical word portion read from the main memory portion 4 by referring to the address table and then updates the address table. Next, in the step S68 the controller writes the error correction code generated by the ECC controller 21 at the address of the ECC memory portion 6 which was previously assigned in the address table 7.

The controller 31 checks in the step S69 to determine whether each of the data blocks of the critical word portion has an error correction code generated and stored in the ECC memory portion 6. If the error correction and storage processes have been performed for each of the data blocks (YES), this operation ends. If the response in the step S69 is NO, the controller 31 returns to the step S64.

If the controller 31 receives the access signal from the host system 2 while it is operating one of the processes shown in FIG. 9, it halts the process to respond to the access signal from the host system 2 and resumes the process when the access signal is released. Since the process of reading the data stored in the main memory portion 4 in the present embodiment is the same as that in the embodiment 2, a description of the process will not be given.

Although the present embodiment has been described with reference to Embodiment 2, it may also be described with reference to Embodiment 1. In this case an error correction code is generated by the conventional method for a byte data of the critical word portion of the image data stored in the main memory portion 4 while there is no access signal from the host system 2 and the error correction code is stored in the ECC memory portion 6. In order to perform this operation the step S65 in the operation shown in FIG. 9 must be deleted. Also the step S69 must be modified so that in this step the controller 31 checks to determine whether each of the bytes of the critical word portion has an error correction code generated and stored in the ECC memory portion 6. Since the rest of the flow chart shown in FIG. 9 remains the same, further explanation will not be given.

As described above, the memory card of the present embodiment of the present invention, unlike the memory cards of Embodiments 1and 2, can write the critical word portion of the image data in the main memory portion 4 and can read it from there without either the request signal for an error correction code or the code termination signal from the host system 2. The memory card of the present embodiment stores the image data in the main memory portion 4 in the conventional method. While the memory card is in the standby mode it recognizes the critical word portion of the stored image data and generates error correction codes for the recognized critical word portion. The address table 7 stores the address of the main memory portion 4 for the critical word portion and also the address of the ECC memory portion 6 for the error correction code associated with the critical word portion relating the two addresses to each other.

From the foregoing it can be seen that Embodiment 3 has the same advantages as Embodiments 1 and 2. In addition, Embodiment 3 generates error correction codes and stores them in the ECC memory portion 6 after it stores the image data in the main memory portion 4 using the conventional method without either a request signal for an error correction code or a code termination signal from the host system. Hence the present embodiment improves the reliability of the image data by means of the error correction codes it generates and shortens the time required for writing the data into the main memory portion 4.

The Hamming code is employed as the error correction code in Embodiments 1, 2, and 3 mentioned above. An alternative error correction coding for each of the embodiments may include the copying of the critical word portion and adding its checksum. In this case the controller stores the copy of the critical word portion and its checksum in the ECC memory portion. The address table 7 maintains the address of the main memory portion where each byte data or block data of the critical word portion is stored and the address of the ECC memory portion where the copy and the checksum corresponding to each byte data or block data are stored.

For example, if a byte data of the main memory portion <11101100> corresponds to a copy <1111100> in the ECC memory portion which is different from the original <11101100>, the checksum stored in the ECC memory portion is used to determine which is a correct byte. If the checksum is <1>, the copy data is wrong; and if the checksum is <0>, the copy data is correct. When the data stored in the main memory portion 4 and its copy data are identical, the checksum is not referred to.

The above method is only useful for the case in which a one-bit error exists. However, the reliability of semiconductor devices is so high that even the probability of a one-bit error in a few mega bits is very low. Therefore, this method improves the reliability of the data, makes the structure of the memory card simpler, and shortens the error correction process time.

All the processes of generating an error correction code, detecting a data error using the error correction code, and correcting the error are performed by the memory card in Embodiments 1, 2, and 3 above. These processes, however, may be performed by the host system 2; in other words, the host system 2 may perform the functions of the controller and the ECC controller of the memory card. Therefore, these controllers are no longer needed. Since the functions of the host system 2 are the same as those of the controllers, no further explanation will be given here. This scheme needs neither a controller nor an ECC controller in the memory card, which makes the structure of the memory card simple and hence reduces its cost.

The memory card according to the first invention, when writing data, has the ECC controller generate an error correction code for specific data to be stored in the first memory portion, stores the generated error correction code in the second memory portion, and stores, in the address converter, the address of the first memory portion where the specific data is stored and the address of the second memory portion where the generated error correction code associated with the specific data is stored relating the two addresses to each other. Thus error correction codes are generated only for specific data. The memory card, therefore, needs only a small memory capacity to store the redundant error correction code data. Further, since the image data stored in the first memory portion has the conventional data format, a conventional host system can also use this memory card, thus making the memory card of the present invention very versatile. Moreover, the operation program of the host system remains simple because the host system is not required to perform error correction.

The memory card according to the second invention is the memory card of the first invention wherein the controller, on reading data from the memory card, checks with the address converter to determine whether an address of the second memory portion has been assigned to an address specified by the host system. If an address has been assigned, the controller has the ECC controller detect a data error in the data retrieved from the first memory portion using the error correction code retrieved from the second memory portion. If a data error is found, the controller has the ECC controller correct the detected data error. The memory card improves the reliability of the data therein by adding error correction codes to the data. Further, the memory card generates error correction codes for only specific data. Therefore, it only needs a small memory capacity to store the redundant error correction code data. Moreover, since the image data stored in the first memory portion has the conventional data format, a conventional host system can also use this memory card, which makes the memory card of the present invention very versatile. Further, the operation program of the host system remains simple because the host system is not required to generate error correction codes or to perform error correction.

The memory card according to the third invention is the memory card of either the first or second invention wherein the specific data is the data the host system specifies to the controller The memory card improves the reliability of the data therein by adding error correction codes to the data. The memory card generates error correction codes only for specific data the host system specifies. Therefore, it needs only a small memory capacity to store the redundant error correction code data. Further, since the image data stored in the first memory portion has the conventional data format, a conventional host system can also use this memory card, which makes the memory card of the present invention very versatile.

The memory card according to the fourth invention is the memory card of either the first or second invention wherein the host system does not need to specify specific data. The memory card stores data in the first memory portion in the conventional way. Then the memory card searches the specific data in the first memory portion, generates an error correction code for the specific data thus found, and stores the generated error correction code in the second memory portion. The memory card improves the reliability of the data therein by adding error correction codes to the data. The memory card needs only a small memory capacity to store the redundant error correction code data. Further, since the image data stored in the first memory portion has the conventional data format, a conventional host system can also use this memory card, which makes the memory card of the present invention very versatile. Moreover, the speed of writing the data from the host system to the first memory portion is fast.

The memory card according to the fifth invention is the memory card of the fourth invention wherein the controller searches the data stored in the first memory, has the ECC controller generate an error correction code, and stores the generated error correction code in the second memory portion while the controller is in the standby mode in which the host system is not attempting to access the controller. The memory card improves the reliability of the data therein by adding error correction codes to the data and needs only a small amount of memory to store the redundant error correction code data. Further, since the image data stored in the first memory portion has the conventional data format, a conventional host system can also use this memory card, which makes the memory card of the present invention very versatile. Moreover, the speed of writing the data from the host system to the first memory portion is high.

The memory card according to the sixth invention is the memory card of one of the first to fifth inventions wherein the address converter is a data table which relates an address of the first memory portion to an address of the second memory portion and which the controller updates every time the controller stores an error correction code in the second memory portion by adding, to the data table, the address of the second memory portion where the error correction code is stored and the address of the first memory portion where the specific data associated with the error correction code is stored relating the two addresses to each other. This memory card has the same advantages as the memory card of one of the first to fifth inventions.

The memory card according to the seventh invention is the memory card of one of the first to sixth inventions wherein an error correction code is generated for each byte of the specific data. Thus, this memory card has the same advantages as the memory card of one of the first to sixth inventions. Further, the error correction process is simple and fast, which improves the response time of the memory card.

The memory card according to the eighth invention is the memory card of one of the first to sixth inventions wherein an error correction code is generated for each block of the specific data. Thus, this memory card has the same advantages as the memory card of one of the first to sixth inventions. The memory card needs an even smaller memory capacity to store the redundant error correction code data.

The memory card according to the ninth invention is the memory card of one of the first to eighth inventions wherein the error correction code is the Hamming code. Thus this memory card has the same advantages as the memory card of one of the first to eighth inventions. Therefore, it needs an even smaller memory capacity to store the redundant error correction code data.

The memory card according to the tenth invention is the memory card of one of the first to eighth inventions wherein the error correction code comprises a copy of specific data and its checksum. Thus, this memory card has the same advantages as the memory card of one of the first to eighth inventions with a faster processing speed for the error correction.

The memory card according to the eleventh invention is the memory card of one of the first to tenth inventions wherein the data stored in the first memory portion is image data and the specific data is the control data of the image data. The memory card generates error correction codes only for the small, error-intolerant control data of the image data formed in the standard format. Therefore, the memory card has the same advantages as the memory card of one of the first to tenth inventions.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A memory card having an interface for connecting the memory card to a host system to receive data from the host system and store the data therein, the memory card comprising:

a first memory for storing first data and second data from the host system, wherein the second data is associated with the first data;

an ECC controller for generating an error correction code for the second data;

a second memory for storing the error correction code generated by said ECC controller;

an address converter for relating an address of the second data stored in said first memory to an address of the error correction code stored in said second memory; and a controller for controlling said first memory, said ECC controller, said second memory, and said address converter;

wherein said ECC controller generates the error correction code when the second data associated with the first data stored by said first memory is sent from the host system and said address converter stores corresponding address information relating an address of said second memory where the generated ECC is stored to an address of said first memory where the corresponding second data is stored.

2. The memory card according to claim 1 wherein, upon reading out the second data stored in said first memory at an address designated by the host system, said controller checks if an address of said second memory corresponding to said designated address is stored in said address converter, and, if it is stored, said ECC controller executes an error detection for the second data stored at the designated address using an ECC stored at the corresponding address stored in said address converter and executes an error correction for the second data when an error is detected.

3. The memory card of claim 1 wherein the second data is data the host system specifies to said controller.

4. The memory card of claim 1 wherein said controller searches the data stored in said first memory to find an identifier that identifies the second data, instructs said ECC controller to generate an error correction code for the second data thus found, and stores the generated error correction code in said second memory.

5. The memory card of claim 4 wherein said controller searches the data stored in said first memory, instructs said ECC controller to generate an error correction code, and stores the generated error correction code in said second memory while said controller is in a standby mode in which the host system is not trying to access said controller.

6. The memory card of claim 1 wherein said address converter is a data table which relates an address of said first memory to an address of said second memory and which said controller updates every time said controller stores an error correction code in said second memory by adding, to said table data, the address of said second memory where the error correction code is stored and the address of said first memory where the second data associated with the error correction code is stored relating the two addresses to each other.

7. The memory card of claim 1 wherein said controller instructs said ECC controller to generate an error correction code for each byte of the second data.

8. The memory card of claim 1 wherein said controller instructs said ECC controller to generate an error correction code for each block of the second data.

9. The memory card of claim 1 wherein the error correction code is the Hamming code.

10. The memory card of claim 1 wherein the error correction code comprises a copy of the second data and its checksum.

11. The memory card of claim 1 wherein the first data stored in said first memory is image data and the second data is control data associated with the image data.

\* \* \* \* \*